E. H. AUSTIN.
Subterranean Telegraph Lines.

No. 138,115. Patented April 22, 1873.

Witnesses:
W. Hauff
E. F. Kastenhuber

Inventor.
Elijah H. Austin

UNITED STATES PATENT OFFICE.

ELIJAH HARRISON AUSTIN, OF NEW YORK, N. Y.

IMPROVEMENT IN SUBTERRANEAN TELEGRAPH-LINES.

Specification forming part of Letters Patent No. 138,115, dated April 22, 1873; application filed February 26, 1873.

*To all whom it may concern:*

Be it known that I, ELIJAH HARRISON AUSTIN, of the city, county, and State of New York, have invented a new and useful Improvement in Conductors for Telegraph-Wires; and I do hereby declare the following to be a full, clear, and exact description thereof, which will enable those skilled in the art to make and use the same, reference being had to the accompanying drawing forming part of this specification, in which drawing—

Figure 1:
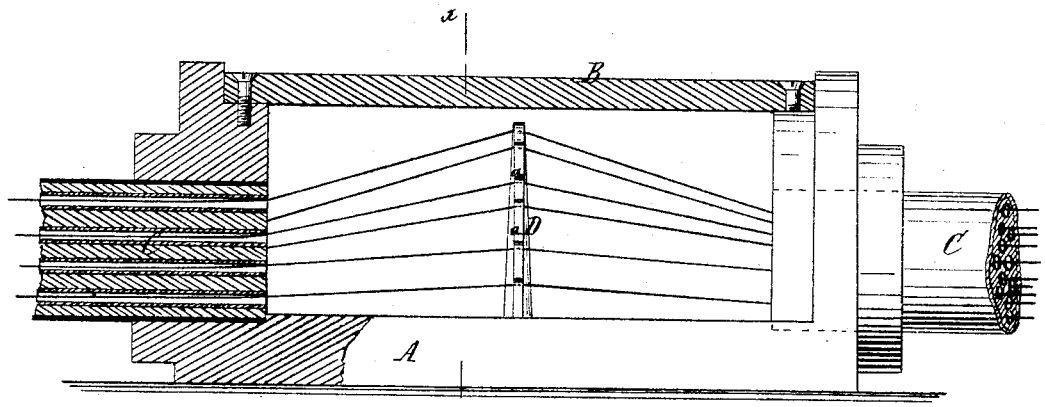
Figure 2:
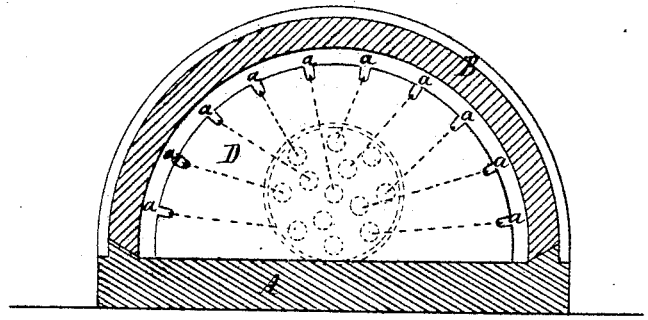

Figure 1 represents a longitudinal section of this invention. Fig. 2 is a transverse section of the same.

Similar letters indicate corresponding parts.

This invention consists in the arrangement of an insulated bridge inclosed in a box which forms the connecting-link between sections of pipes which inclose one or more telegraph-wires in such a manner that, by opening said box, access can be had to the wire or wires whenever it may be desirable.

In the drawing, the letter A designates a box, made of cast-iron or any other suitable material, and provided with a cover, B, so that by removing said cover access can be had to the interior of the box. The ends of the box connect with pipes C C, which represent sections of a conductor for telegraph-wires, and which may be arranged with one or more passages, according to the number of telegraph-wires to be passed through the same. In the interior of the box A is secured an insulated bridge, D, provided with one or more notches, *a*, (see Fig. 2,) through which the wires are passed.

By this arrangement easy access can be had to any part of the telegraph wire or wires, and repairs can be effected with facility. The conductors C C may, for instance, be used in cities for the wires of fire-alarm telegraphs. In this case said conductors are provided with a multiplicity of passages, one insulated from the other, so as to make room for the required number of wires. If the conductors are placed under ground and one of the wires gets broken or inoperative, it is impossible to repair the same without much trouble and expense, and for this reason subterranean conductors for telegraph-wires have not been considered practical. But by my improvement I am enabled to repair each wire with the greatest facility. The bridge containing boxes A will be distributed at suitable intervals along the line, and if either of the wires becomes inoperative, it can readily be determined by an electrometer where the faulty place exists in the wire, and by opening the boxes next to this place the fault can be remedied without much trouble.

In order to facilitate the operation of picking out the faulty wire, the notches in the bridges are numbered to correspond to the number of the wires, and if it is found, for instance, that wire 4 is inoperative, this wire is easily picked out by opening the boxes and looking at the numbers marked on the bridges.

By my improvement subterranean conductors for telegraph-wires are rendered practicable, and any repairs which may be required on such wires can be made with as much ease as on wires suspended on poles.

What I claim as new, and desire to secure by Letters Patent, is—

The arrangement of boxes A containing insulated bridges D between the sections C C of a conductor for telegraph-wires, substantially as and for the purpose herein shown and described.

ELIJAH H. AUSTIN.

Witnesses:
W. HAUFF,
E. F. KASTENHUBER.